United States Patent [19]

Sorocin

[11] 4,055,357
[45] Oct. 25, 1977

[54] COLLAPSIBLE CARRY-ALL CART

[76] Inventor: Viera Sorocin, 77 Quebec Avenue, Apt. 1025, Toronto, Ontario, Canada

[21] Appl. No.: 673,373

[22] Filed: Apr. 5, 1976

[51] Int. Cl.² ............................................. B62B 11/00
[52] U.S. Cl. ..................................... 280/641; 280/649
[58] Field of Search ................ 280/651, 649, 641, 659

[56] References Cited

U.S. PATENT DOCUMENTS

| 2,531,856 | 11/1950 | Marcouiller | 280/641 |
| 2,632,653 | 3/1953 | Rollie | 280/641 |
| 3,082,016 | 3/1963 | Pratt | 280/641 |
| 3,388,920 | 6/1968 | Hill, Sr. | 280/641 |

Primary Examiner—Robert R. Song

[57] ABSTRACT

A collapsible carry-all cart includes a frame which is provided with side rod members that are retractable to thereby selectively collapse or extend the cart in a front to rear direction. The frame has a pair of legs with wheels mounted thereon at each side thereof. The pairs of legs are pivotable in scissor-like fashion and are slidable vertically on the frame from an extended position in which the cart is rollable on the wheels to a storage position in which the pairs of legs are shifted to an upper position. A handle element extends upwardly from the rear of the frame, and a cover member is secured to the frame in order to provide a storage compartment. An accordion-type pocket is integral with the cover at the front of the cart.

5 Claims, 5 Drawing Figures

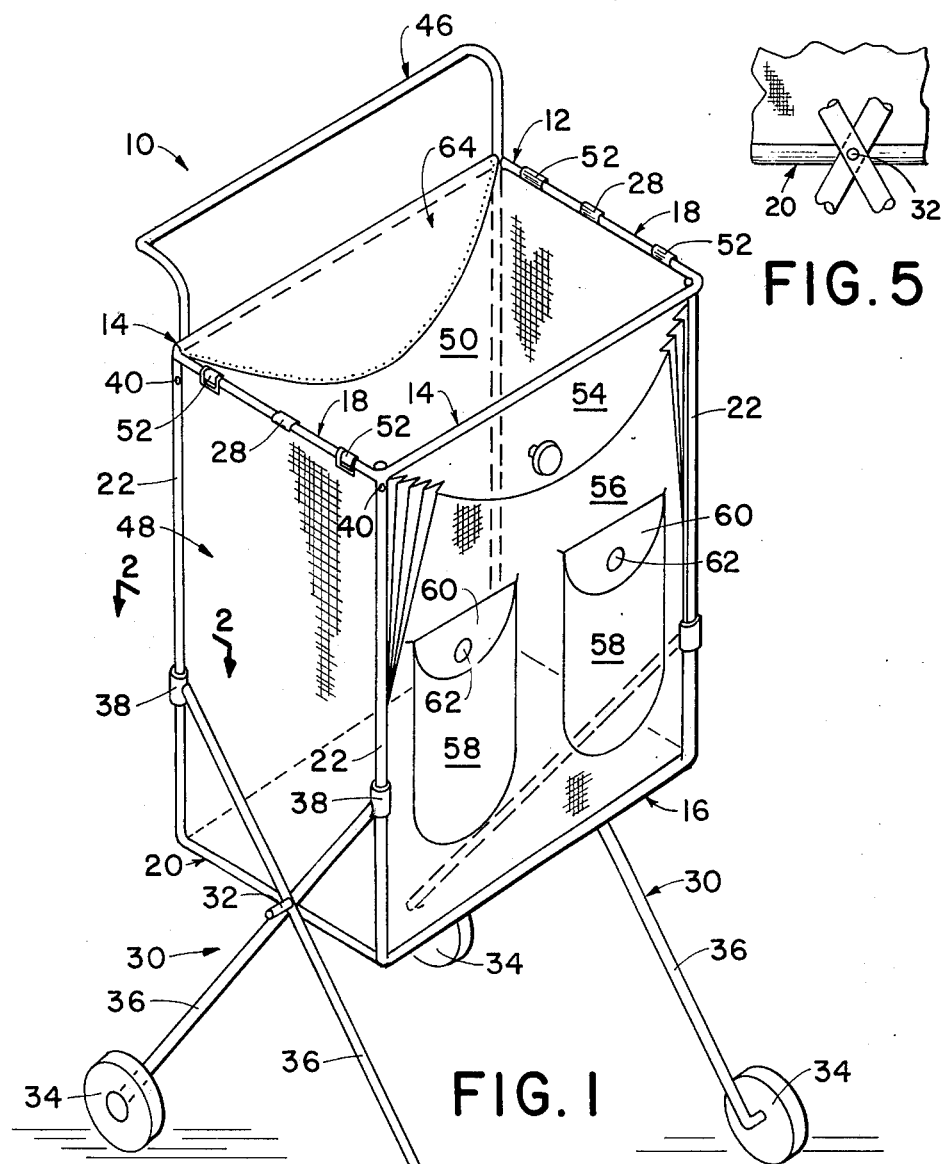

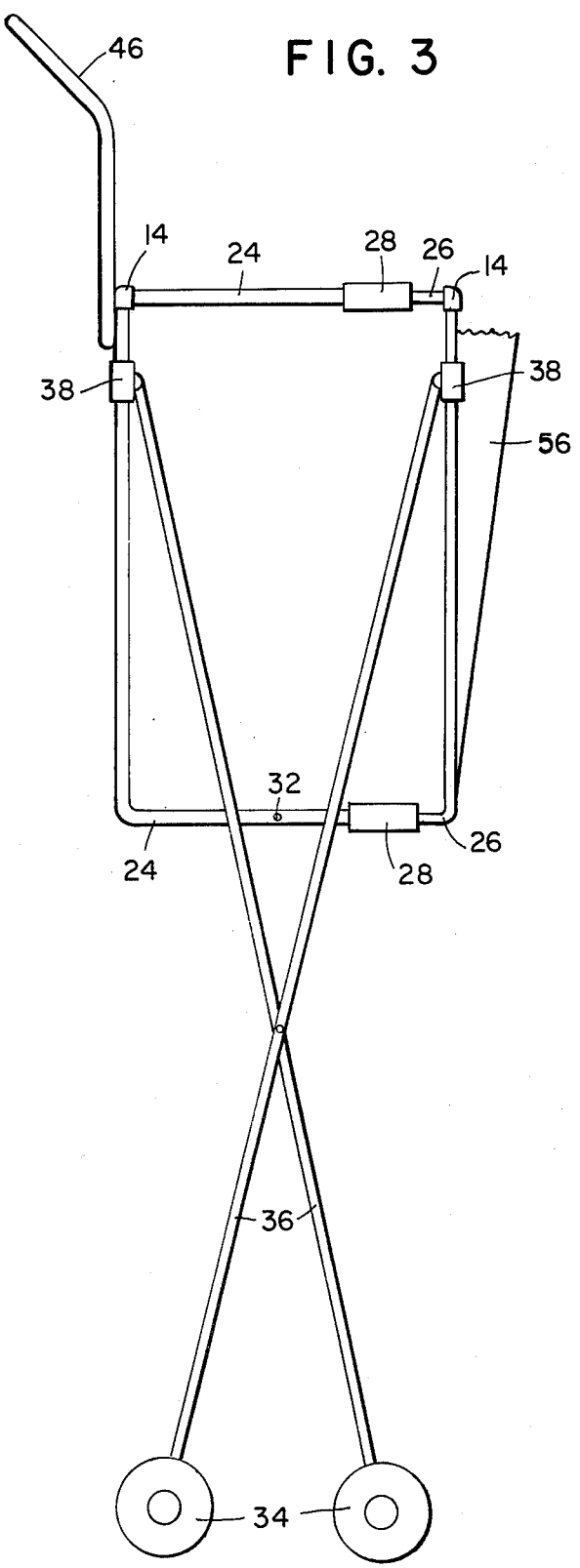

COLLAPSIBLE CARRY-ALL CART

BACKGROUND OF THE INVENTION

The present invention relates to collapsible carry-all carts and more particularly, to such a cart which can easily be collapsed into its storage position.

Collapsible carry-all carts have been known heretofore. However, although such carts are collapsible in a front-to-rear direction they have not provided for a convenient storage of the wheels or rollers in an up-down direction. Typical of such prior carts is the one disclosed in U.S. Pat. No. 3,627,344 issued Dec. 14, 1971 to Anthony Rizzato. The cart of Rizzato is provided with a pair of wheels and is adapted to have a second pair mounted when so desired. The basket portion of the cart is collapsible.

SUMMARY OF THE INVENTION

It is one object of the invention to provide a collapsible carry-all cart which enables the collapsing of the wheel-carrying and frame portions into compact form for storage and extension of the frame and wheel-carrying portions into a position where it is characterized by its ease of handling.

It is another object of the invention to provide a collapsible carry-all cart which can be easily collapsed into a compact form for storage or extended for comfortable rollable use, the cart being characterized by its simple construction.

Other objects and advantages of the invention will become readily apparent from the following description of the invention.

According to the present invention there is provided a collapsible carry-all cart comprising: a frame including upper and lower front and rear transversely extending elongated members, retractable upper and lower pairs of elongated spaced parallel side members secured therebetween, and upright corner post members connected between the respective junctures of the upper and lower transverse and side members; a pair of leg members carried slidably respectively by the upright post members at the sides of the frame, the pair of leg members each including a pair of leg elements having a wheel member mounted rotatably at the lower end thereof and a collar at the other end thereof, the collars being slidably mounted on the corresponding post members, and the leg elements being pivotably connected to each other at a location intermediate the ends thereof; a handle element carried by the frame projecting upwardly therefrom at the rear thereof; and a cover member secured to the frame and depending therefrom to provide a storage compartment.

BRIEF DESCRIPTION OF THE DRAWINGS

In order that the invention may be more fully comprehended it will now be described, by way of example, with reference to the accompanying drawings in which:

FIG. 1 is a perspective view of the collapsible carry-all cart of the invention in its extended form;

FIG. 2 is a fragmentary top view partly broken away showing the mounting of one of the legs on the upright post member of the frame viewing in the direction of line 2—2;

FIG. 3 is a side elevational view of the cart shown in FIG. 1 in its collapsed form;

FIG. 4 is a fragmentary top view of one of the side rod members and the slide collar; and FIG. 5 is an enlarged end view of the pivotal connection between the leg elements and showing their relationship to the guide pin.

DETAILED DESCRIPTION OF THE INVENTION

Referring to the drawings there is shown generally as indicated by reference number 10, the collapsible carry-all cart of the invention.

The cart is formed of a rectilinear frame 12 which includes upper and lower front and rear laterally or transversely extending rod or tube members 14, 16, retractable upper and lower pairs of spaced parallel side rod members 18, 20 and upright corner post members 22 connected between the junctures of the upper and lower transverse and side rod members. Desirably the frame is constructed of a metal such as either steel or aluminum to provide a strong relatively light-weight structural assembly.

Each of the side rod members preferably comprises a pair of telescoping elements 24, 26 which are maintained in slidable relation within a collar 28. It will be appreciated that the collar or the elements 24, 26 may be provided with cooperable detent means for locking the elements in their extended positions. Since various conventional arrangements are known to effectuate such locking the present specification will not be unnecessarily burdened with the details of such construction.

On each side of the cart there is positioned a pair of legs 30 which may either be connected at approximately their mid-points by a pivot pin or be mounted at such location on a hollow bushing dimensioned to receive a guide pivot pin 32 carried by the lower side rod members 20. In such manner the pairs of leg members are mounted pivotably on the frame of the cart. A wheel or roller element 34 is carried rotatably at the lower end of each leg element 36 comprising the pairs of leg members. The upper end of each such leg element is surmounted by a collar 38 which is adapted to slide along one of the upright post members of the frame. It will be understood, of course, that the ends of the leg elements and the collars mounted thereon may be connected by means of a ball joint (not shown) to permit pivotal movement as may be required as the legs are moved between an upper storage position and a lower position in which the legs are locked in place for rollable movement of the cart. It will be further appreciated that in pivoting about guide pin 32 the leg members are adjustable so as to vary the overall height of the cart as may be desired. Openings 40 are desirably formed in the upright post members at vertically spaced locations in order to lock the leg members at the selected position. A spring 42 biases a ball element 44 into the selected opening for locking of the leg member. As the leg elements pivot about their point of pivotal connection the collars slide up or down along the upright post members. For storage the leg members may be removed from engagement with the guide pin 32 to release the leg member for upward movement into its upper storage position.

A handle element 46 extends upwardly from the rear of the frame and preferably is curved rearwardly for comfortable handling of the cart. Such handle may be a continuation of the rear upright post members or it may be separately secured to either the upper rear transverse member 14. The junctures of the upright post members at their upper and lower extremities with the other frame elements may be made in any suitable manner such as by welding or the like. It will be understood also that the front upright posts and the lower front transverse element may be a U-shaped unitary member and the rear upright post members may each be separately formed and integral with one of the side rod elements, the upper transverse members may be formed so as to each be integral with a pair of side rod elements to present a U-shaped member. In such event the front lower side element at each side of the frame is separately joined to the lower front transverse member. However, the elements of the frame may be formed and joined in a variety of constructions and are not critical to the invention. It is essential, however, that the upper and lower side rod elements be capable of collapsing (as by telescoping into each other) and of being extended when the cart is to be used.

The frame is provided with a cover member 48 which may be made of canvas, sheet plastics or the like to thereby provide a storage compartment 50. Loops 52 may be formed at the upper peripheral edge of the cover member for connection with the frame. The cover is desirably provided on its front face 54 with an accordion-type pocket 56 which itself is given at least one pocket 58. Each of such pockets may be given a flap 60 securable over the opening of the pocket such as by a button 62 or the like. One preferred arrangement includes a pocket 64 or the inner rear face of the cover member.

From the foregoing it will be seen that a strong, attractive, relatively light-weight carry-all cart has been provided which can be easily collapsed or extended as desired. The construction is simple and enables the compact storage of the wheel carrying leg members and frame.

I claim:
1. A collapsible carry-all cart comprising:
 a frame including upper and lower front and rear transversely extending elongated members, retractable upper and lower pairs of elongated spaced parallel side members secured therebetween, and upright corner post members connected between the respective junctures of the upper and lower transverse and side members;
 a pair of leg members carried slidably respectively by the upright post members at the sides of the frame, said pair of leg members each including a pair of leg elements having a wheel member mounted rotatably at the lower end thereof and a collar at the other end thereof, said collars being slidably mounted on the corresponding post members, and said leg elements being pivotably connected to each other at a location intermediate the ends thereof;
 a handle element carried by said frame projecting upwardly therefrom at the rear thereof;
 and a cover member secured to said frame and depending therefrom to provide a storage compartment.

2. A cart according to claim 1, wherein each of said upright post members is provided with at least two openings therein at vertically spaced locations and each of said collars is provided with a spring-biased element selectively positionable in one of said openings to thereby lock the leg member in a desired position.

3. A cart according to claim 1, wherein each of said pairs of side members include telescoping first and second elements and a slide collar mounted thereon adapted to lock said first and second elements in fixed relation.

4. A cart according to claim 1, wherein each of the lower side members is provided with a guide pin element adapted to engage with the associated leg member at the pivotal connection of the leg elements thereof to thereby guide said leg members as they shifted vertically on said post members.

5. A cart according to claim 1, wherein an accordion-type front exterior pocket is formed integral therewith.

* * * * *